United States Patent
Jonsson

(10) Patent No.: US 8,729,826 B2
(45) Date of Patent: May 20, 2014

(54) DUAL-MODE DIMMING OF A LIGHT

(75) Inventor: Karl Jonsson, Rancho Santa Margarita, CA (US)

(73) Assignee: Greenwave Reality, PTE, Ltd., Singapore (SG)

( * ) Notice: Subject to any disclaimer, the term of this patent is extended or adjusted under 35 U.S.C. 154(b) by 55 days.

(21) Appl. No.: 13/610,732

(22) Filed: Sep. 11, 2012

(65) Prior Publication Data

US 2013/0214699 A1   Aug. 22, 2013

Related U.S. Application Data

(63) Continuation-in-part of application No. 13/195,655, filed on Aug. 1, 2011, now Pat. No. 8,421,376, which is a continuation of application No. 12/795,395, filed on Jun. 7, 2010, now Pat. No. 8,013,545.

(51) Int. Cl.
*H05B 37/02* (2006.01)

(52) U.S. Cl.
USPC ........... 315/297; 315/307; 315/318; 315/312; 315/58; 362/227; 362/365; 362/801; 340/815.45; 340/855.9; 445/66; 702/62; 702/60

(58) Field of Classification Search
CPC ............... H05B 37/02; H05B 37/0272; H05B 37/0245; H05B 33/0818; F21K 9/135
USPC .............. 315/318, 307, 360, 291, 297, 169.1, 315/200 R, 185 R, 56, 58; 362/227, 249.02, 362/265, 362, 365, 441, 800, 801; 340/815.45, 855.8, 855.9; 445/60, 66, 445/69; 702/60, 62, 64
See application file for complete search history.

(56) References Cited

U.S. PATENT DOCUMENTS

| | | | |
|---|---|---|---|
| 4,612,670 A | | 9/1986 | Henderson |
| 6,166,496 A | * | 12/2000 | Lys et al. ........................ 315/316 |
| 6,528,954 B1 | * | 3/2003 | Lys et al. ........................ 315/291 |
| 7,014,336 B1 | * | 3/2006 | Ducharme et al. ............ 362/231 |
| 8,013,545 B2 | | 9/2011 | Jonsson |
| 8,264,172 B2 | * | 9/2012 | Valois et al. ................... 315/312 |
| 8,421,376 B2 | | 4/2013 | Jonsson |
| 8,422,889 B2 | | 4/2013 | Jonsson |
| 8,430,402 B2 | | 4/2013 | Diehl et al. |
| 8,452,554 B2 | | 5/2013 | Jonsson |
| 8,531,137 B2 | * | 9/2013 | Jonsson ......................... 315/318 |

FOREIGN PATENT DOCUMENTS

| | | |
|---|---|---|
| WO | 2011049882 A1 | 4/2011 |
| WO | 2011050013 A2 | 4/2011 |
| WO | 2011050047 A1 | 4/2011 |

OTHER PUBLICATIONS

Jonsson, Modular Networked Light Bulb, Unpublished U.S. Appl. No. 13/776,778, filed Feb. 26, 2013.
USPTO, Notice of Allowance for U.S. Appl. No. 13/776,778, filed May 13, 2013.
Jonsson, Speech Recognition in a Lighting Apparatus, Unpublished U.S. Appl. No. 13/862,360, filed Apr. 12, 2013.

* cited by examiner

Primary Examiner — Haiss Philogene
(74) Attorney, Agent, or Firm — Bruce A. Young

(57) ABSTRACT

Various methods and apparatus for controlling brightness of a light emitting apparatus include controlling a brightness of a light emitting device based on a brightness value, receiving a message over a network, and detecting a modulation of a power input of the light emitting apparatus. The brightness value is changed based on both the message and the modulation.

30 Claims, 7 Drawing Sheets

DUAL-MODE DIMMING OF A LIGHT

BACKGROUND

1. Technical Field

The present subject matter relates to lighting. More specifically, it relates to control of a networked light.

2. Description of Related Art

In the past, most lighting systems used incandescent or florescent light bulbs for illumination. As light emitting diode (LED) technology improves, it is being used more and more for general illumination purposes. In many cases, LED based light bulbs are a direct replacement for a traditional incandescent or florescent light bulb and do not include any other functionality. In some cases, however, additional functionality is included within a lighting apparatus.

Providing home automation functionality using networking is well known in the art. Control of lighting and appliances can be accomplished using systems from many different companies such as X10, Insteon® and Echelon. Other home automation systems may utilize radio frequency networks using protocols such as IEEE 802.15.4 Zigbee or Z-Wave networking protocols.

Most buildings are constructed with wiring in the walls and ceilings carrying alternating current (AC) voltage from a central distribution point to the various outlets, appliances and lighting fixtures in the building. Some of the wiring circuits may include dimmer switches that may modulate the AC power that is provided to light fixtures to control the brightness of incandescent lights.

BRIEF DESCRIPTION OF THE DRAWINGS

The accompanying drawings, which are incorporated in and constitute part of the specification, illustrate various embodiments. Together with the general description, the drawings may serve to explain various principles. They should not, however, be taken to limit the claims to the specific embodiment(s) shown, but are for explanation and understanding only. In the drawings:

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

The term "light emitting diode" or "LED" refers to a semiconductor device that emits light, whether visible, ultraviolet, or infrared, and whether coherent or incoherent. The term as used herein includes incoherent polymer-encased semiconductor devices marketed as "LEDs", whether of the conventional or super-radiant variety. The term as used herein also includes semiconductor laser diodes and diodes that are not polymer-encased. It also includes LEDs that include a phosphor or nanocrystals to change their spectral output. It can also include organic LEDs.

Traditional dimmer switches were designed for incandescent lighting and may provide for a simple and efficient way of dimming such legacy lighting technology. Newer forms of lighting however, such as fluorescent lighting, LED based lighting, or other types of lighting, which operate on different principles than incandescent lighting, may not react to the modulated AC power in the same way. While network messages, which may be messages or some other type of information packet sent over the network, may be used to control the brightness of some networked lighting apparatuses, many existing installations may already have traditional dimmer switches in place, which may be used to control the brightness of newer lighting technologies if appropriate circuitry is included in the lighting.

Reference now is made in detail to the examples illustrated in the accompanying drawings and discussed below.

Figure 1A:
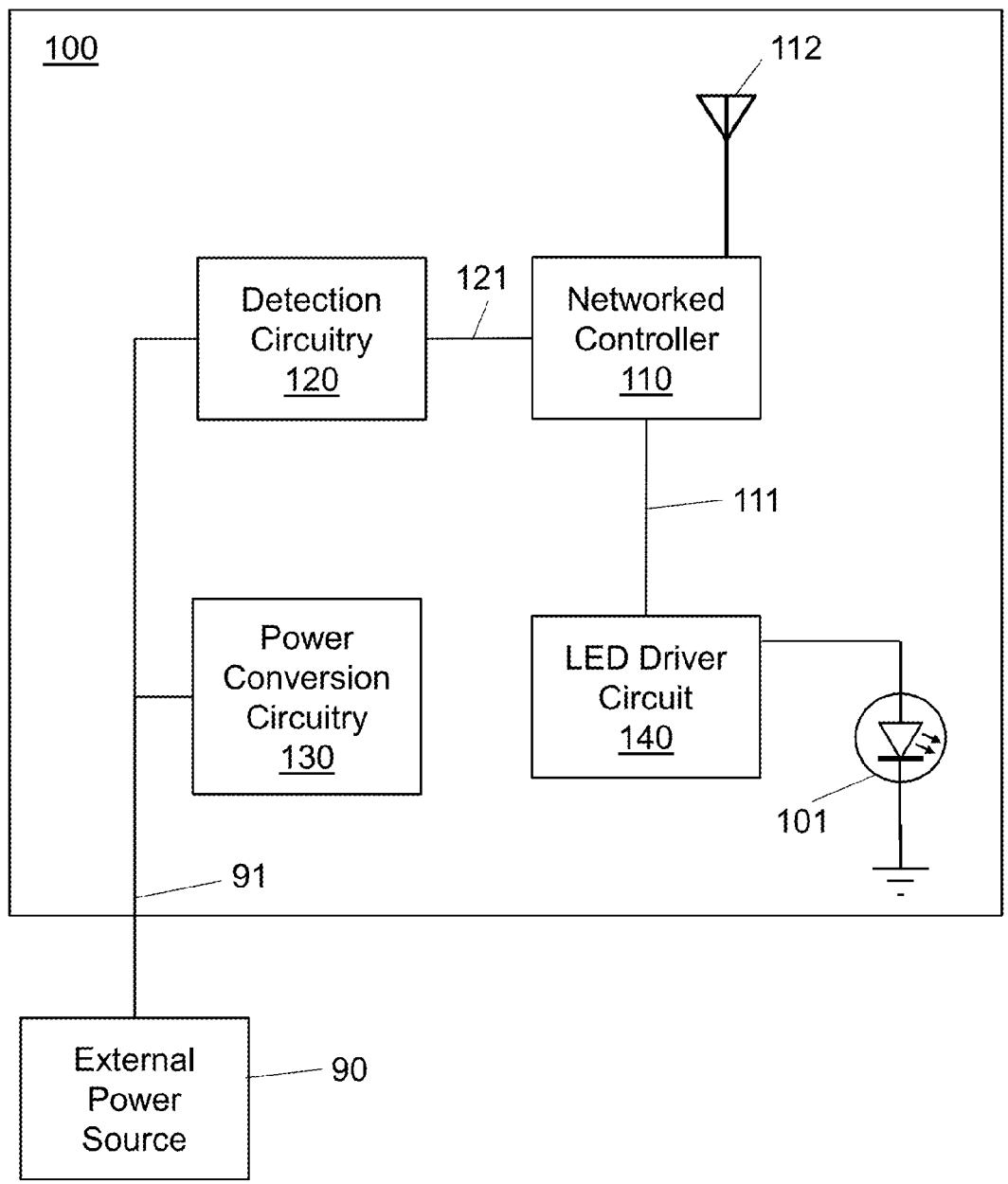
FIG. 1A shows a block diagram of an embodiment of a lighting apparatus.

FIG. 1 shows a block diagram of an embodiment of a lighting apparatus 100, which may also be referred to as a light emitting apparatus, a light bulb, a luminaire, a light fixture, or any one of various other terms used in the art. An external power source 90 may be connected to the lighting apparatus 100 through power input 91. The external power source may be any type of energy source including, a battery, a direct current (DC) voltage source, a solar panel, a fuel cell, or any other type of power source. In some embodiments, the external power source may be the alternating current (AC) power grid connected to the lighting apparatus 100 using an AC voltage circuit such as in a home or other structure. Some embodiments of the lighting apparatus may be designed to be hard-wired into the AC voltage circuit while other embodiments may utilize a socket or other user accessible mechanism to allow for end-user installation of the lighting apparatus 100.

The lighting apparatus 100 may include power conversion circuitry 130 suitable for converting the power provided by the external power source 90 to the lighting apparatus 100 through the power input 91 to a type suitable for a particular embodiment, although some embodiments may be able to utilize the power provided through the power input 91 directly without any power conversion circuitry. Various types of circuitry well known in the art may be used, depending on the embodiment, but in many embodiments, the power conversion circuitry 120 may convert commonly available AC power at about 120 root-mean-square volts (VAC) or about 220 VAC to one or more voltages of DC power. The power conversion circuitry 130 may provide power to the networked controller 110, the detection circuitry 120, and the LED driver circuit 140. In some embodiments a single DC output from the power conversion circuitry 130 may be used to power the various blocks, but other embodiments may have more than one power output to power various blocks. The power outputs of the power conversion circuitry 130 may have different voltage and or current capabilities and in some embodiments one or more output may be substantially unchanged from the power received from the power input 91. Some embodiments of the power conversion circuitry may provide one or more outputs of DC power and one of more outputs of AC power, which may be used in some embodiments to drive a fluorescent lamp. In some embodiments, modulation of the power input 91 may impact the amount of power available from the power input 91. The power conversion circuitry 130 may have a minimum level at which it may function. So for example, the power conversion circuitry 130 may not be able to provide the power used by the lighting apparatus 100 if the modulation characteristic falls below 10%.

The LED driver circuitry 140 may be configured to provide power to one or more LEDs 101 to provide illumination. Any illumination level could be provided by the lighting apparatus 100, but to typically be considered a source for illumination the LED 101 may output at least the equivalent of a 5 watt incandescent bulb, or at least 25 lumens of luminous flux. Some embodiments may have a light output about 850 lumens, which may be equivalent to a 60 W incandescent bulb, or a light output about 1700 lumens, which may be about equivalent to a 100 W incandescent bulb. The LED driver circuitry 140 may be an integrated circuit such as the NXP SSL2101 or similar parts from Texas Instruments or others.

Other embodiments may utilize some other type of light emitting device instead of using one or more LEDs. Some embodiments may use a fluorescent light such as a coiled compact fluorescent light (CFL) or a fluorescent tube, an incandescent light, an arc light, a plasma light, or other type of light emitting element in addition to, or instead of, one or more LEDs. The LED driver circuitry 140 may be changed to be appropriate to the chosen light emitting device.

In embodiments, the power provided by the external power source 90 at the power input 91 may be modulated. Such modulation may be useful to dim a common incandescent bulb in some embodiments. Standard light dimming switches may use a variety of modulation techniques including, but not limited to leading edge phase control, trailing edge phase control, peak limiting, amplitude modulation, pulse-width modulation, and various other techniques. Many standard dimmer switches used on common household AC circuits utilize some type of phase control to change the amount of power delivered to the load. Because an incandescent bulb effectively integrates the power received over time, and then converts the electrical power into light and heat, such dimmer switches may be effective for incandescent bulbs. Other types of light emitting apparatuses may not match the behavior of an incandescent bulb and other techniques may be used to dim the lighting apparatus 100.

The detection circuitry 120 may detect modulation of the power input 91 and may detect a characteristic of the modulation of the power input 91. Various embodiments of detection circuitry 120 may be used and may depend on the expected type of modulation used on the power input 91. Several embodiments of detection circuitry 120 are shown in FIG. 3A-D and are discussed later. The detection circuitry 120 may provide information based on a characteristic of the modulation on one or more lines 121 to the networked controller 110.

Figure 1B:
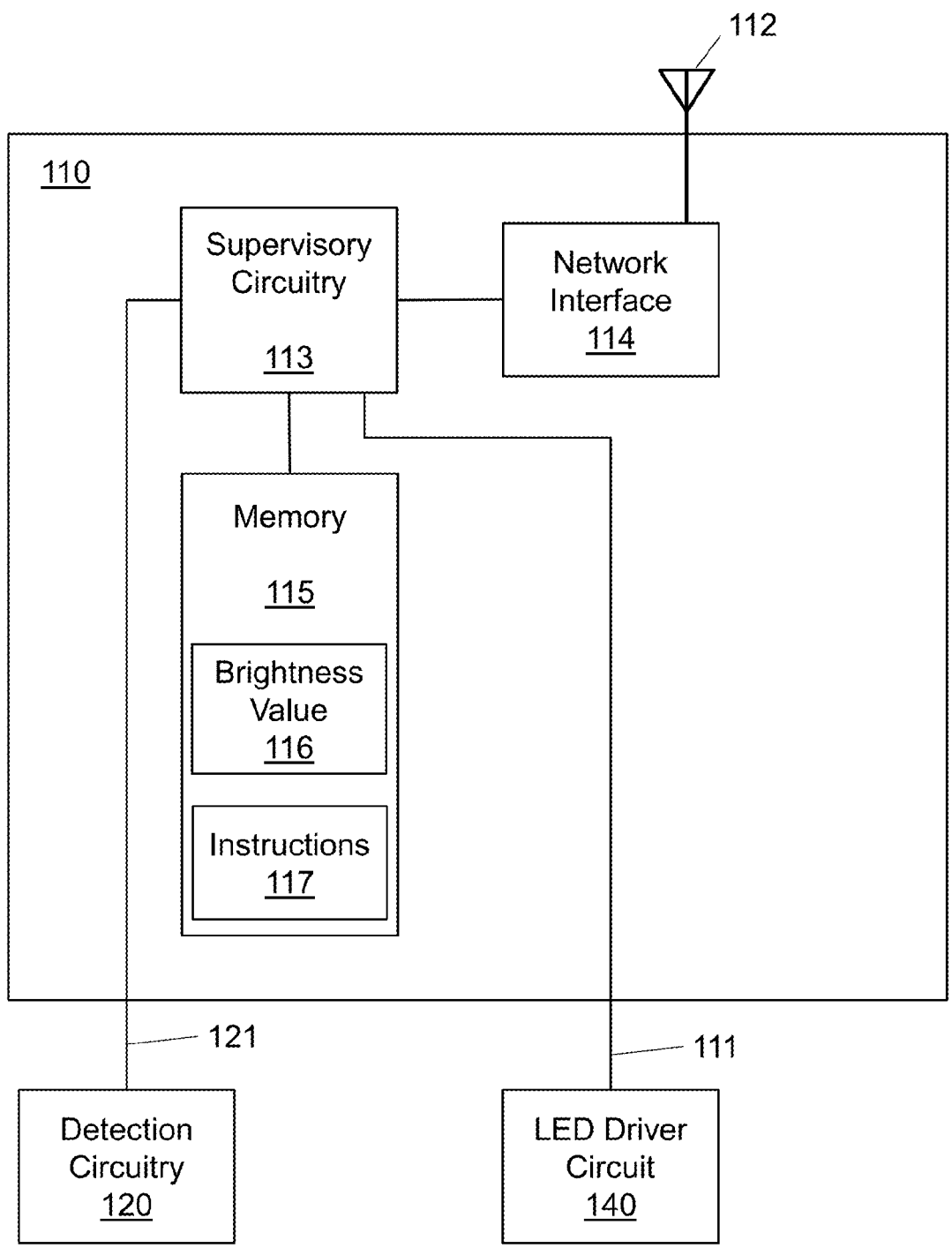
FIG. 1B shows a block diagram of an embodiment of a networked controller.

The networked controller 110 may include a microprocessor, memory and a network interface or may be some other configuration of circuitry. One embodiment of the networked controller 110 is shown in FIG. 1B. The networked controller 100 may be capable of communicating over a network, which may be a wireless network in some embodiments. The antenna 112, which may be coupled to the network controller, may be used to receive messages from the network.

The networked controller 110 may maintain a brightness value which may be stored in a random access memory (RAM) location, a register, a latch, or some other type of electronic memory. The brightness value may be initialized as the light emitting apparatus first receives power and may be maintained in non-volatile memory in some embodiments. The brightness value may be used to control at least one control line 111 to control the brightness of a light emitting device. In some embodiments, the control line may directly power the light emitting device but other embodiments may provide the control line 111 to circuitry, such as the LED driver circuitry 140, adapted to control the brightness of the light emitting device, such as the LED 101, based on the control line 111. The control line 111 may be controlled in various ways, depending on the embodiment. In some embodiments, a direct current (DC) voltage level provided on the control line 111 which may be varied to control the brightness. In other embodiments, the control line 111 may be modulated using pulse-width modulation (PWM) techniques to control the brightness. Other embodiments may provide a digital value over a serial or parallel interface to control the brightness. Other techniques may be used for other embodiments.

Figure 6A:
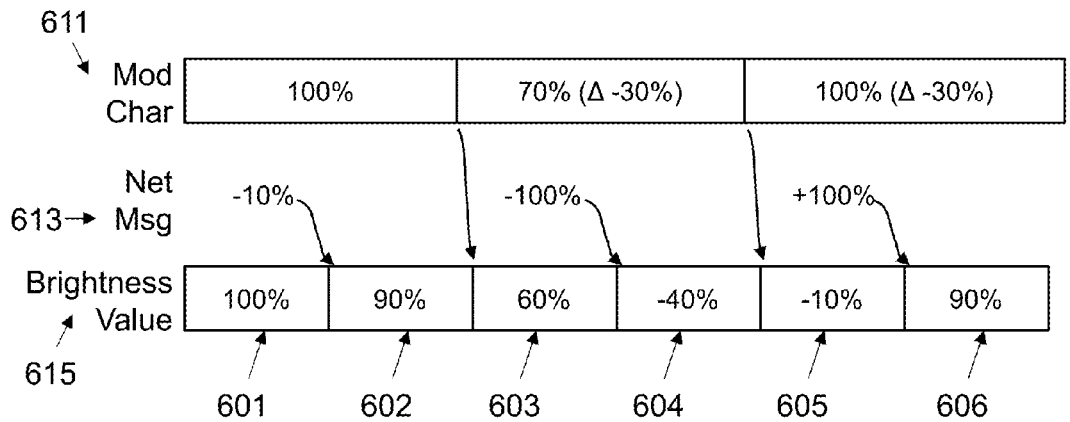
FIGS. 6A and 6B show examples of dual mode dimming using two different embodiments.
Figure 6B:
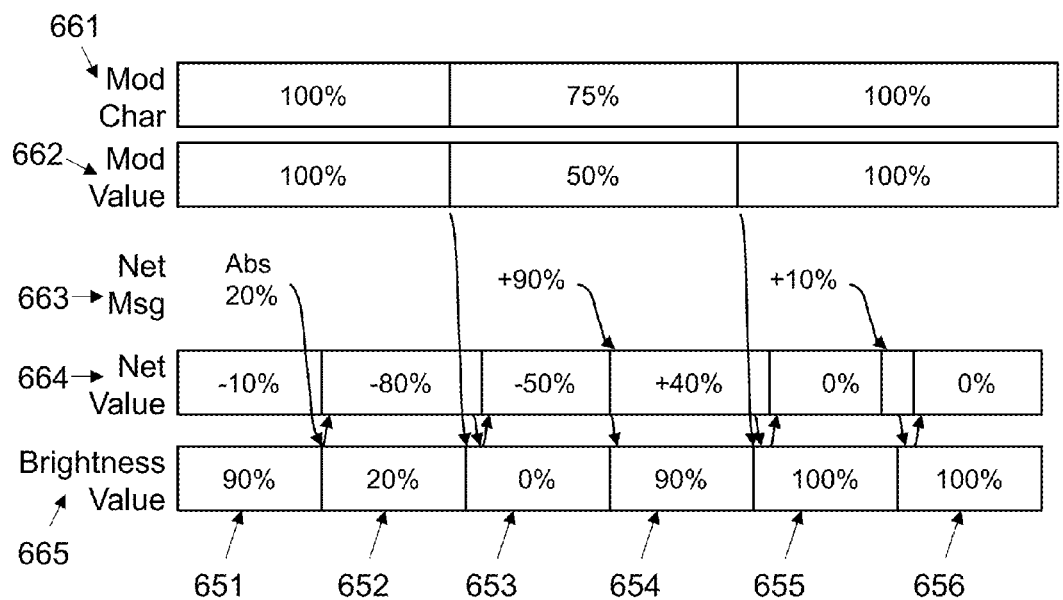

The brightness value may be changed by the networked controller 110 based on messages received over the network and based on the modulation of the power input. In some embodiments, setup registers, which may be set by messages received over the network, may be provided in the networked controller 110 to determine how the brightness level may be changed by the modulation of the power input 91 and by messages. In some embodiments, the messages may directly change the brightness value. In at least one embodiment, the brightness value may be set to an absolute value by a message. In another embodiment, the brightness value may be changed by a relative value received in a message. In some embodiments, the brightness value may be varied by a change of the modulation of the power input, such as a decrease of 10% in the brightness value if the modulation characteristic changes by 10%. In another embodiment, the brightness value may be changed to match the absolute value of the modulation characteristic if there is a change in the characteristic, which may then be varied by messages over the network until the modulation characteristic changes again. Two different algorithms are illustrated in FIGS. 6A and 6B, but any type of algorithm dependent on both messages from the network and the modulation of the power input 91 may be used, depending on the embodiment.

In some embodiments the networked controller 110 may include functionality to determine if the modulation characteristic is too low for the power conversion circuitry 130 to be able to provide power for the rest of the lighting apparatus 100. In such cases, the networked controller 110 may include a threshold for the modulation characteristic, so if the modulation characteristic falls below a predetermined threshold based on the design of the power conversion circuitry 130, the networked controller 110 may provide for an orderly shutdown of the lighting apparatus 100. In some embodiments, the power conversion circuitry 130 may provide a status line to the networked controller 110 to provide an indication of its inability to deliver power, but other embodiments, may simply use a fixed threshold determined at design time to compare against the modulation characteristic received from the detection circuitry 120 on line 121.

In some embodiments the lighting apparatus 100 may be in communication with other lighting apparatuses over the network. The lighting apparatus 100 may send a message over the network to another light emitting apparatus. The networked controller 110 may be the part of the lighting apparatus 100 that sends the message. The message may contain information to control a brightness of the other light emitting apparatus. In some, embodiments, the lighting apparatus 100 may act as a master device with the other light emitting apparatus acting as a slave device, with the master lighting apparatus 100 sending information to the slave light emitting apparatus based on the brightness value of the master, to set the brightness of the slave based on the brightness of the master. In some embodiment, the slave may be kept at the same brightness as the master.

FIG. 1B shows a block diagram of an embodiment of a networked controller 110 that may be suitable for use in a lighting emitting apparatus such as lighting apparatus 100. The networked controller 110 may have an input 121, which may be one or more lines, to receive information regarding a modulation of a power line from the detection circuitry 120. The networked controller 110 may have one or more control lines 111 capable to control a brightness of a light emitting device. The networked controller may include supervisory circuitry 113 to manage the operation of the networked controller 110. The supervisory circuitry 113 may be coupled to the input 121 and the control line 111, as well as at least one memory location, such as the memory 115, capable of storing the brightness value 116.

The networked controller 110 may also include a network interface 114 capable of communicating over a network. Any type of network may be supported, but in many embodiments, a wireless network using radio frequency communication may be used, such as a version of 802.11 Wi-Fi, a network compliant with an IEEE 802.15.4 specification or a variant thereof, such as Zigbee or Low power Wireless Personal Area Networks (6LoWPAN), or other wireless networks such as Bluetooth, Z-Wave, or one of many other wireless networking protocols, proprietary or open. In at least one embodiment, a wireless network using a JenNet-IP network layer running on an IEEE 802.15.4 physical layer network with 6LoWPAN encapsulation may be used. If a wireless network using radio frequency communication is used, the antenna 112 may be included. Some embodiments may use separate integrated circuits for the supervisory circuitry 113, the memory 115, and/or network interface 114, but in many embodiments, multiple parts of the networked controller 110 may be integrated into a single integrated circuit (IC). In some embodiments the supervisory circuitry 113 and the memory 115 may be integrated into a single IC having at least one input 121 and at least one control line 111. In one embodiment utilizing as IEEE 802.15.4 Zigbee networking, a microprocessor acting as the supervisory circuitry 113, memory 115 and Zigbee wireless network interface 114 are integrated into a single integrated circuit such as the CC2539 from Texas Instruments. Another embodiment utilizing Z-Wave networking may use a Zensys ZM3102N module based on the Zensys ZW0301 integrated circuit as an integrated networked controller 110.

The supervisory circuitry 113 may be any type of circuitry capable of controlling the actions of networked controller 110, including, but not limited to, a finite state machine, a sequencer, a microprocessor, a microcontroller, or other type of processor. In some embodiments, the supervisory circuitry 113 may execute instructions 117 stored in the memory 115, which may be a non-transitory computer readable medium. In some embodiments the instructions 117, as they are executed by the supervisory circuitry, may result in controlling at least one control line 111 based on a brightness value 116, receiving a message over a network, changing the brightness value 116 based on the message, and changing the brightness value 116 based on a modulation of a power input of the light emitting apparatus. The instructions 117 may provide for additional functionality in some embodiments such as the method of flowchart 500 in FIG. 5 or other functionality. In at least one embodiment, the supervisory circuitry 114 may or may not execute instructions, but may still be configured to receive a message over the network, change the brightness value 116 based on the message, and change the brightness value 116 based on the information received from the at least one input 121, which may be based on a characteristic of the modulation of a power input. The supervisory circuitry 113 may also control the at least one control line 111 based on the brightness value 116 to control the brightness of a light emitting device, such as an LED.

Figures 2A, 2B:
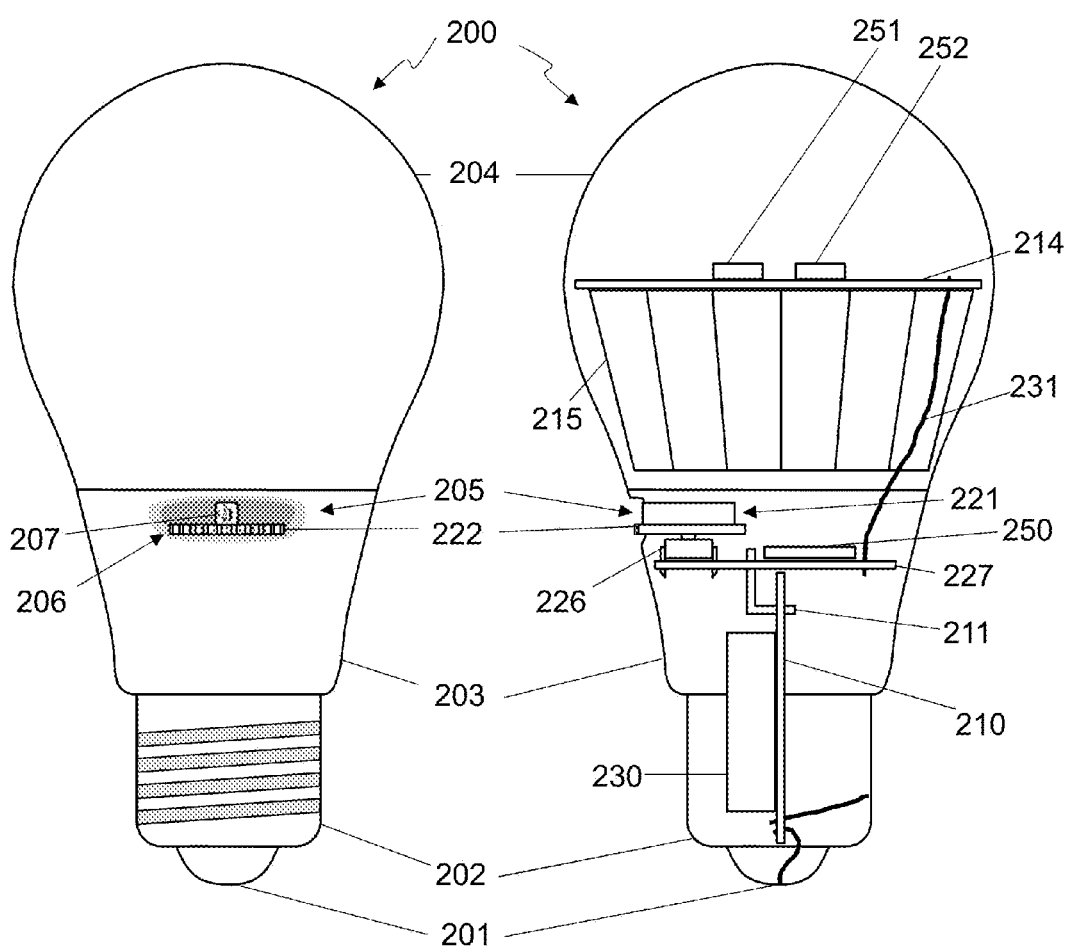
FIG. 2A is an elevational view and FIG. 2B is a cross-sectional view of an embodiment of a light bulb.

FIG. 2A is an elevational view (with inner structure not shown) and FIG. 2B is a cross-sectional view of an embodiment of a light bulb 200. Wall thicknesses of some mechanical parts are not shown to simplify the drawing. In this embodiment a networked light bulb 200 is shown but other embodiments could be a light fixture with embedded LEDs, a compact fluorescent bulb (CFL), or any other sort of light emitting apparatus. The networked light bulb 200 of this embodiment may have an Edison screw base with a power contact 201 and a neutral contact 202, a middle housing 203 and an outer bulb 204. Each section 201, 202, 203, 204 may be made of a single piece of material or be assembled from multiple component pieces. In some embodiments, one fabricated part may provide for multiple sections 201, 202, 203, 204. The outer bulb 204 may be at least partially transparent and may have ventilation openings in some embodiments, but the other sections 201, 202, 203 can be any color or transparency and be made from any suitable material. The middle housing 203 may, in some embodiments, have an indentation 205 with a slot 206 and an aperture 207. Such embodiments may include a color wheel 221 or other physically manipulatable device useful for providing configuration or control information from the user. The color wheel 221 may be attached to the shaft of rotary switch 226 which may be mounted on a printed circuit board 227. The printed circuit board 227 may also have networked controller 250 mounted on it. The printed circuit board 227 may be mounted horizontally so that the edge 222 of the color wheel 221 may protrude through the slot 206 of the middle housing 203. This may allow the user to apply a rotational force to the color wheel 221 to change settings.

In the embodiment shown, a second printed circuit board 210 may be mounted vertically in the base of the networked light bulb 200. The second printed circuit board 210 may contain the power conversion circuitry 230 and the detection circuitry. In some embodiments, the LED driver circuitry may also be mounted on the second printed circuit board 210. A board-to-board connection 211 may be provided to connect selected electrical signals between the two printed circuit boards 227, 210. Control signals, such as the lines for information related to the modulation and the control line for controlling the brightness of the LEDs, and the power supply connections may be among the signals included on the board-to-board connection 211. A third printed circuit board 214 may have LEDs 251, 252 mounted on it and may be backed by a heat sink 215 to cool the LEDs 251, 252. In some embodiments the third printed circuit board 214 with the LEDs 251, 252 may be replaced by a single multi-die LED package. A cable 231 may carry power from the LED driver circuitry (which may be mounted on either the printed circuit board 227 or the second printed circuit board 210) to the LEDs 251, 252, coupling the first printed circuit board 227 to the third printed circuit board 214, or, in some embodiments the cable 231, may couple the second printed circuit board 210 directly to the third printed circuit board 214 instead of passing the signals through the printed circuit board 227. Other embodiments may utilize a different system partitioning with the various components on different PC boards and some embodiments may use more or fewer PC boards than the embodiment shown.

The light bulb 200 may be of any size or shape. It may be a component to be used in a light fixture or it may be designed as a stand-alone light fixture to be directly installed into a building or other structure or used as a stand-along lamp. In some embodiments, the light bulb may be designed to be substantially the same size and shape as a standard incandescent light bulb. A light bulb designed to be compliant with an incandescent light bulb standard published by the National Electrical Manufacturer's Association (NEMA), American National Standards Institute (ANSI), International Standards Organization (ISO) or other standards bodies may be considered to be substantially the same size and shape as a standard incandescent light bulb. Although there are far too many standard incandescent bulb sizes and shapes to list here, such standard incandescent light bulbs include, but are not limited to, "A" type bulbous shaped general illumination bulbs such as an A19 or A21 bulb with an E26 or E27, or other sizes of Edison bases, decorative type candle (B), twisted candle, bent-tip candle (CA & BA), fancy round (P) and globe (G) type bulbs with various types of bases including Edison bases of various sizes and bayonet type bases. Other embodiments may replicate the size and shape of reflector (R), flood (FL), elliptical reflector (ER) and Parabolic aluminized reflector (PAR) type bulbs, including but not limited to PAR30 and PAR38 bulbs with E26, E27, or other sizes of Edison bases. Other embodiments may be shaped as a standard compact fluorescent light bulb (CFL). In other cases, the light bulb may replicate the size and shape of a standard bulb used in an automobile application, most of which utilize some type of bayonet base. Other embodiments may be made to match halogen or other types of bulbs with bi-pin or other types of bases and various different shapes. In some cases the light bulb 200 may be designed for new applications and may have a new and unique size, shape and electrical connection. Other embodiments may be a light fixture, a stand-alone lamp, or other light emitting apparatus.

FIG. 3A-D show various embodiments of detection circuitry. The schematics shown illustrate certain concepts, techniques and key components, but may not be suitable for a mass production environment. One of ordinary skill can, without undue experimentation, use the circuitry shown as a basis for a complete design including component specifications and full embodiment including such additional components as bypass and filtering capacitors, power supply design, transient suppression, layout and safety considerations.

Figure 3A:
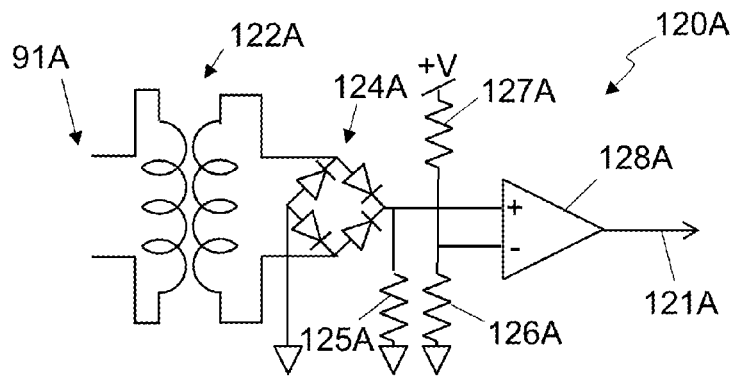
FIG. 3A-D show various embodiments of detection circuitry.
Figure 4A:
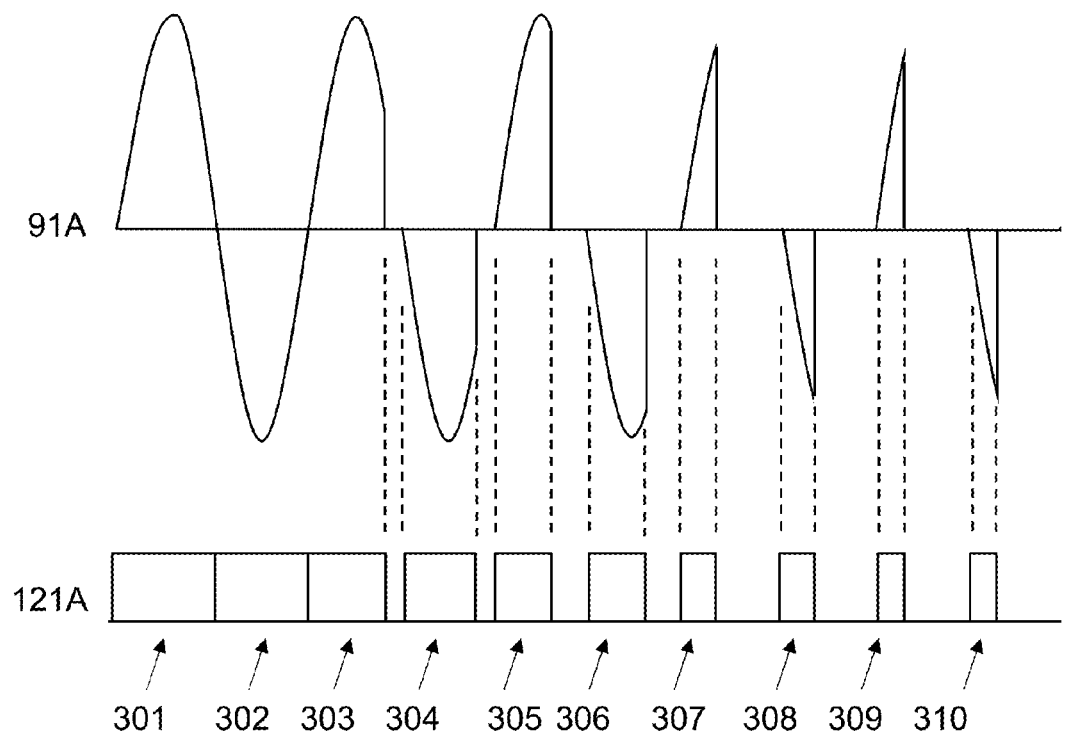
FIGS. 4A and 4B show two different modulations of the power input with outputs of embodiments of detection circuitry.

FIG. 3A is a schematic of an embodiment of detection circuitry 120A that may be useful in certain embodiments for detecting a phase modulation of an AC power line 91A such as trailing edge chop or leading edge chop modulation, as may be common for standard household light dimming switches. An example of trailing edge chop modulation is shown in FIG. 4A, Detection circuitry 120A may include a transformer 122A with its primary winding coupled to the input power line 91A. The transformer 122A may provide isolation from the primary circuitry for safety and may provide for a voltage reduction from the AC power line 91A by choosing an appropriate winding ratio between the primary winding and the secondary winding. The secondary side of the transformer 122A may be coupled to a full-wave rectifier 124A to create a rectified voltage waveform having a positive voltage with respect to the circuit ground. A load resistor 125A may be used to allow the shape of the waveform at the output of the rectifier 124A to represent the modulation of the power line 91A and to minimize the filtering of the waveform by any stray capacitance that may be present on the output of the rectifier 124A. The resistance value of the resistor 125A may not be critical, but may involve a tradeoff between power consumption and the high frequency response of the detection circuitry 120A. In at least one embodiment, the resistor 125A may be a 1 kilo-ohm (kΩ) resistor, providing a time constant of less than 1 microsecond (μs) as long as the stray capacitance at the output of the rectifier 124A is less than 0.001 microfarad (μF), which may be sufficient for a 60 hertz (Hz) power input 91A.

The output of the rectifier 124A may be coupled to the input of a comparator 128A with the other input of the comparator 128A coupled to a resistive divider network including resistor 126A and resistor 127A. The values of the resistors 126A, 127A of the divider network may not be critical but may establish a reference voltage at the comparator that is between ground and the minimum voltage level expected at the rectifier 124A output for the minimum operating conditions of the lighting apparatus. So for example, if the lighting apparatus is specified to operate at a 10% modulation characteristic or greater (i.e. ≥10% of the AC waveform provided) on a 120 V RMS AC circuit (≈170 V peak), the peak voltage passed by the dimmer may be about $\sin(10\% \times \pi) = 31\%$ of the peak voltage, or about 52 V. If the transformer 122A has a 1:50 primary to secondary winding ratio, the peak full-wave output of the transformer 122A may be about 3.4 V peak, and allowing about 0.6 V for the full-wave rectifier 124A, the peak voltage to the comparator may be about 2.8 V, which may be compatible with a 3.3 V power supply. So if the incoming power input is modulated to a 10% level, the modulated peak voltage from the transformer 122A may be about 31% of 3.4 V=1.0 V, causing the input to the comparator 128A to be about 0.4 V after accounting for the rectifier 124A. So the resistive divider may present a voltage to the comparator 128A that is less than about 0.4 V, but high enough to minimize spurious switching due to noise on the power line. In one embodiment where the power supply is 3.3 V, the pull-up resistor 127A may be a 33 kΩ resistor and the pull-down resistor 126A may be a 2200 ohm (Ω) resistor to present a reference voltage of about 0.2 V to the comparator 128A. Other embodiments may use different resistor values.

The output 121A of the comparator 128A may be coupled to the supervisory circuitry which may use software to determine a duty cycle of the line 121A. Other embodiments may utilize additional circuitry to determine duty cycle which may be presented to the supervisory circuitry as a digital value. Other embodiments may use the output 121A to create an analog voltage that is related to the duty cycle. The analog voltage may be coupled to an analog to digital converter (ADC) which may be integrated into the supervisory circuitry such as a microcontroller. The duty cycle may represent the characteristic of the modulation and may be used to modify the brightness value.

Figure 3B:
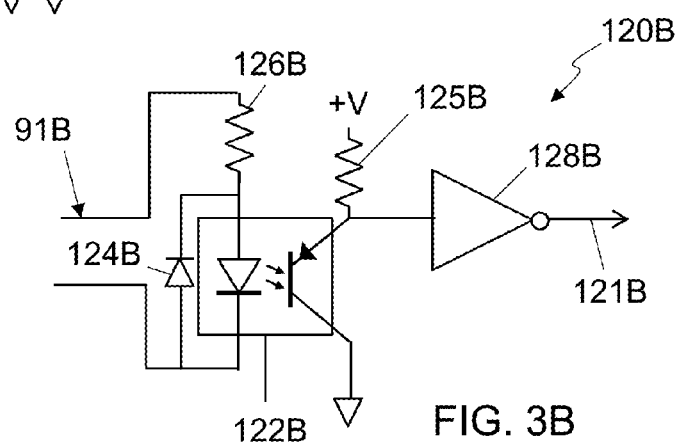

FIG. 3B is a schematic of an alternative embodiment of detection circuitry 120B. The detection circuitry 120B may be useful in similar embodiments to those for detection circuitry 120A. The detection circuitry 120B may detect a phase modulation of an AC power line 91B such as trailing edge chop or leading edge chop modulation as may be common for standard household light dimming switches. The detection circuitry 120B may include an opto-isolator 122B that is coupled to an AC power input 91B through a current limiting resistor 126B. The value of the current limiting resistor 126B may vary depending on the embodiment but for a 120 VAC power input 91B having a peak voltage of about 170 V, and assuming a maximum current rating of 20 milliamps (mA) for the LED of the opto-isolator 122B, a minimum resistance value of 170/0.02=8500Ω may be appropriate, so a 10 kΩ resistor may be used for the current limiting resistor 126B. The light emitting diode (LED) in the opto-isolator 122B may conduct during a positive phase of the AC power input 91B and an opposite phase diode 124B may conduct during the negative phase to minimize a reverse voltage across the LED of the opto-isolator 122B. The opto-isolator may provide safety isolation from the primary circuit.

The output of the opto-isolator 122B may be an open collector output with an external pull-up 125B, which may be coupled to an input of a logic gate such as the inverter 128B. While a wide range of resistance values may be used for the pull-up resistor 125B, at least one embodiment may use a resistance value of 10 kΩ for the pull-up resistor 125B. The output 121B of the inverter 128B may be provided to the supervisory circuitry to determine a duty cycle that may be used to determine the characteristic of the modulation of the power input 91B, although other embodiments may include additional circuitry to further manipulate the output 121B, similar to those described for the output 121A above. Because the output 122B is inverted, the supervisory circuitry may measure the low period instead of the high period of the output 121A to determine the duty cycle. And because a half-wave rectification is used in the detection circuitry 120B, the duty cycle may be doubled to determine the modulation characteristic. For example if the modulation characteristic is at 100% so that the full sine wave is provided, the duty cycle of the output 121B is only 50%, so it may be doubled to provide the actual characteristic to be used to change the brightness value.

Figure 3C:
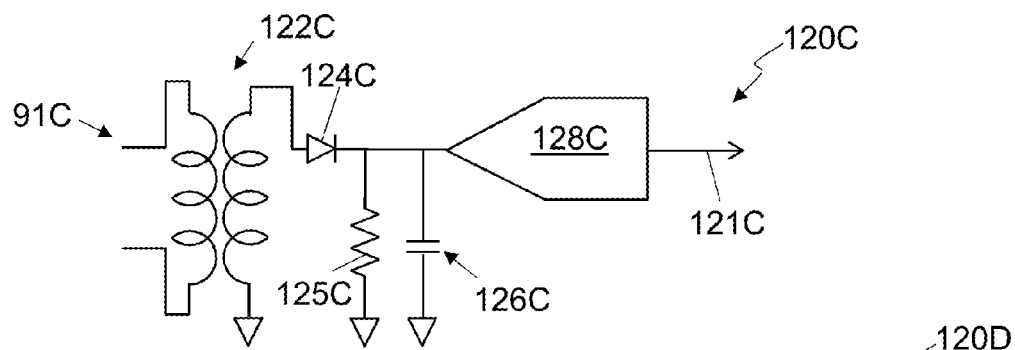
Figure 4B:
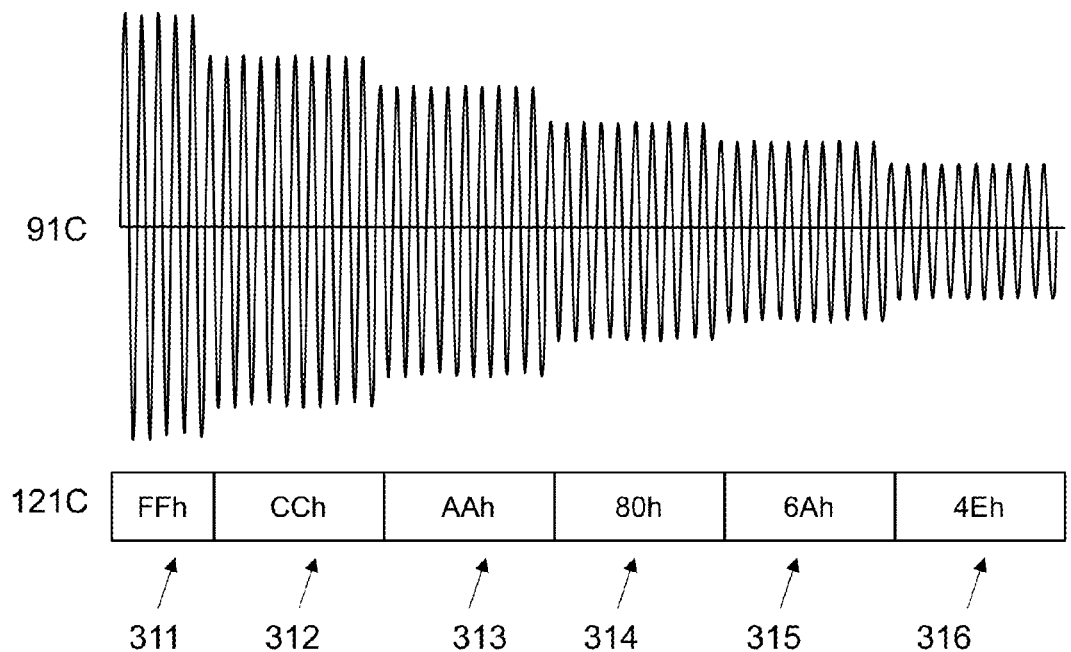

FIG. 3C is a schematic of an alternative embodiment of detection circuitry 120C. The detection circuitry 120C may be useful for detecting an amplitude modulation of an AC power input 91C as shown in FIG. 4B. The detection circuitry 120C may include a transformer 122C with its primary winding coupled to the input power line 91C. The transformer 122C may provide isolation from the primary circuitry for safety and may provide for a voltage reduction from the AC power line 91C by choosing an appropriate winding ratio between the mains winding and the secondary winding. The secondary side of the transformer 122C may be coupled to a half-wave rectifier 124C to create a rectified voltage waveform. A filter capacitor 126C and load resistor 125C may be used to filter the rectified voltage waveform and to minimize the ripple on the line fed to the analog to digital converter (ADC) 128C. Some embodiments may also include a current limiting resistor between the rectifier 124C and the filter capacitor 126C to minimize in-rush current. Values of the filter capacitor and load resistor 125C may vary between embodiments, but in one embodiment using a 60 Hz power input where a response to a change of the modulation within about a quarter second is desired, a time constant of about one third of the desired response time may be selected, or about 80 ms; so, a value of 0.1 μF for the filter capacitor 126C and a value of 820Ω for the load resistor 125C may be used.

The ADC 128C may convert the voltage level of the filtered output of the rectifier 124C to a digital value which may be provided to the supervisory circuitry on the output 121C to use as the characteristic of the modulation. The ADC 128C may have any number of bits, with at least one embodiment having 4 bits and another embodiment having 8 bits. The digital value may be scaled, depending on the embodiment and depending on what digital value corresponds to the maximum amplitude of the input power 91C. In at least one embodiment, the transformer 122C, and the power supply and reference voltage of an 8 bit ADC 128C may be selected so that the maximum expected voltage corresponds to a decimal value of 255 for an 8 bit ADC 128C. In another embodiment, having a power input 91C peak voltage of about 170V, a transformer 122C having a 1:144 primary to secondary winding ration may be selected to provide a peak rectified voltage of about 1.18 V. The ADC 128C may be provided a reference voltage of about 3.0 V so that the 8 bit output of the ADC 128C may have a peak decimal value of 100, allowing the output of the ADC 128C to be used directly as a percentage modulation characteristic.

Figure 3D:
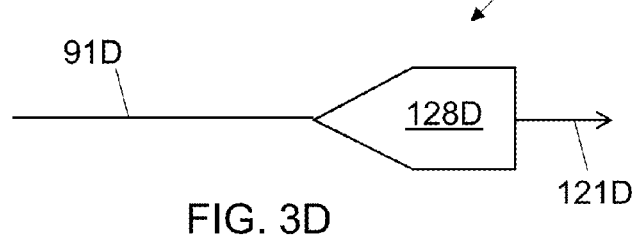

FIG. 3D is a schematic of an alternative embodiment of detection circuitry 120D. The detection circuitry 120D may be useful for detecting an amplitude modulation of a DC power input 91D. For such embodiments, the power input 91D may be coupled directly to the ADC 128D which may convert the voltage level of the power input 91D to a digital value which may be sent to the supervisory circuitry on output 121D. Some embodiments may include a filter capacitor on the input of the ADC 128D and some embodiments may include a resistive voltage divider on the power input 91D to present a lower voltage to the ADC 128D.

Various other embodiments of detection circuitry may be used for embodiments. The details of the detection circuitry may vary depending on the expected modulation of the power input and many more modulation techniques may useful for other embodiments. Other examples of modulation techniques may include clipping of an AC power input, which may be detectable by detection circuitry 120C of FIG. 3C. Other examples of modulation techniques may include chopping of both edges of an AC power input, pulse-width modulation (PWM) of a DC power input, frequency modulation of an AC power input, amplitude modulation of a small signal AC waveform superimposed on a DC power input, modulating a digital symbol onto the power input using one of a variety of modulation schemes that are known in the art, or any other modulation of a power input. Appropriate detection circuitry may range from a simple resistive voltage divider for a DC PWM modulated power input, to complicated radio-frequency demodulator circuits, depending on the embodiment, and may be determined by one of ordinary skill once the modulation of the power input to be supported is known.

FIGS. 4A and 4B show two different modulations of the power input with outputs of embodiments of detection circuitry. FIG. 4A shows an AC power input 91a waveform that utilizes trailing edge chop modulation which may be generated by a standard household AC dimmer switch. In trailing edge chop modulation, the positive phase and the negative phase may both be shortened by "chopping" off the trailing edge of the waveform for each phase of the cycle. The example waveform for the power input 91A is idealized with the modulation of each individual cycle varying from adjacent cycles. In many actual systems, the changes in modulation may be much more gradual, with many cycles of the waveform having the same, or nearly the same, modulation. The rate of change of the modulation changes compared to the cycle time of the waveform has been greatly increased in FIGS. 4A and 4B to more clearly show the principles.

The first (positive) phase 301 and the second (negative) phase 301 make up the first cycle. The waveform is substantially a full sine waveform without any trailing edge chop. The characteristic of the modulation of such a waveform may be thought to be 100%. The output 121A of the detection circuitry 120A shows a waveform that is high for the duration of the first phase 301 as well as the second phase 302, although there may be a short duration low period between the first phase 301 and second phase 302 in some embodiments due to the details of the implementation. In at least one embodiment, the input power may have a frequency of about 60 Hz so that a phase period is about 8 milliseconds (ms).

The third phase 303 may have its trailing edge of the power input 91A chopped off after about 75% of the full phase period, or about 6 ms. The output 121A may stay high for the about 6 ms that the power input 91A is at a positive voltage, then go low for about 2 ms. During the fourth phase 304, the trialing edge of the power input 91A may also be chopped off after about 6 ms, so the output 121A may go back high at the beginning of the fourth phase 304 but go low after about 6 ms. A processor or other supervisory circuitry may sample the output 121A at a rate much higher than 60 Hz and calculate a duty cycle of 75% during the third phase 404 and fourth phase 304. The sample period may depend on the desired granularity of any detected change of the modulation of the power input 91A. If 100 distinct levels are desired, at least 100 samples may be taken during one phase period. In at least one embodiment, 200 samples per phase period may be taken by the supervisory circuitry, so the sample rate may be 24 kilohertz (kHz), or one sample about every 42 microsecond (μs). The supervisory circuitry may keep a running total of the number of samples that are high during one phase period, and divide that by 2 to determine the characteristic of the modulation.

To continue the example, the power input 91A may be chopped about 5 ms into the fifth phase 305 and the sixth phase 306, with the output 121A following with a similar duty cycle to indicate a modulation level of about 60%. The power input 91A may be chopped about 3 ms into the seventh phase 307 and eighth phase 308 and about 2 ms into the ninth phase 309 and tenth phase 310. The duty cycle of the output 121A may then be about 35% during the seventh phase 307 and eighth phase 308 and about 20% during the ninth phase 309 and tenth phase 310. The supervisory circuitry may include algorithms in its calculation of duty cycle to filter out short term variation such as calculating the duty cycle over a larger period of time or other techniques to reduce noise or otherwise manipulate the input samples.

FIG. 4B shows an amplitude modulated AC power input 91C. The output 121C of the detection circuitry 120C is also shown. The amplitude of the power input 91C may change more slowly over time in many actual embodiments, but the discrete changes shown in FIG. 4B may make it easier to understand the concepts described. The power input 91C may start at a maximum amplitude, which may be about 120 VAC in some embodiments. The ADC 128C, which may be an 8 bit ADC in some embodiments, may be designed so that the maximum amplitude of the power input is converted to a FF hexadecimal (h) value (255 decimal). So during the first time period 311, the output 121C sends a FFh value to the supervisory circuitry as the characteristic of the modulation. The supervisory circuitry may normalize the value received to a percentage value by dividing the input by FFh to get a value between 0 and 100% in some embodiments. Other embodiments may not normalize the information received or may perform a non-linear conversion to compensate for certain characteristics of the light emitting device, the modulation, or to create some desired behavior.

During the second period 312, the input power 91C may be modulated down to about 95 VAC, or about 80%, so the output 121C may send a CCh value. The power input 91C may be about 80 VAC during the third period 313 so a value of AAh equal to about two thirds of the maximum FFh value may be sent on the output 121C. Voltage levels of about 60 VAC, 50 VAC, and 35 VAC may be present on the power input 91C during the fourth period 314, the fifth period 315 and the sixth period 316 respectively with respective values of the output 121C of 80h, 6Ah, and 4Eh representing percentage values of about 50%, 40%, and 30%.

Various embodiments may sample the power input 91C at different intervals. In some embodiments, the voltage may be sampled at a rate much higher than the frequency of the power input 91C and software algorithms may be used to smooth the data. Other embodiments may sample at a relatively slow rate that may be similar to the response time desired for reaction to a change in the modulation, such as every 250 ms. Any sample rate may be used for embodiments.

Figure 5:
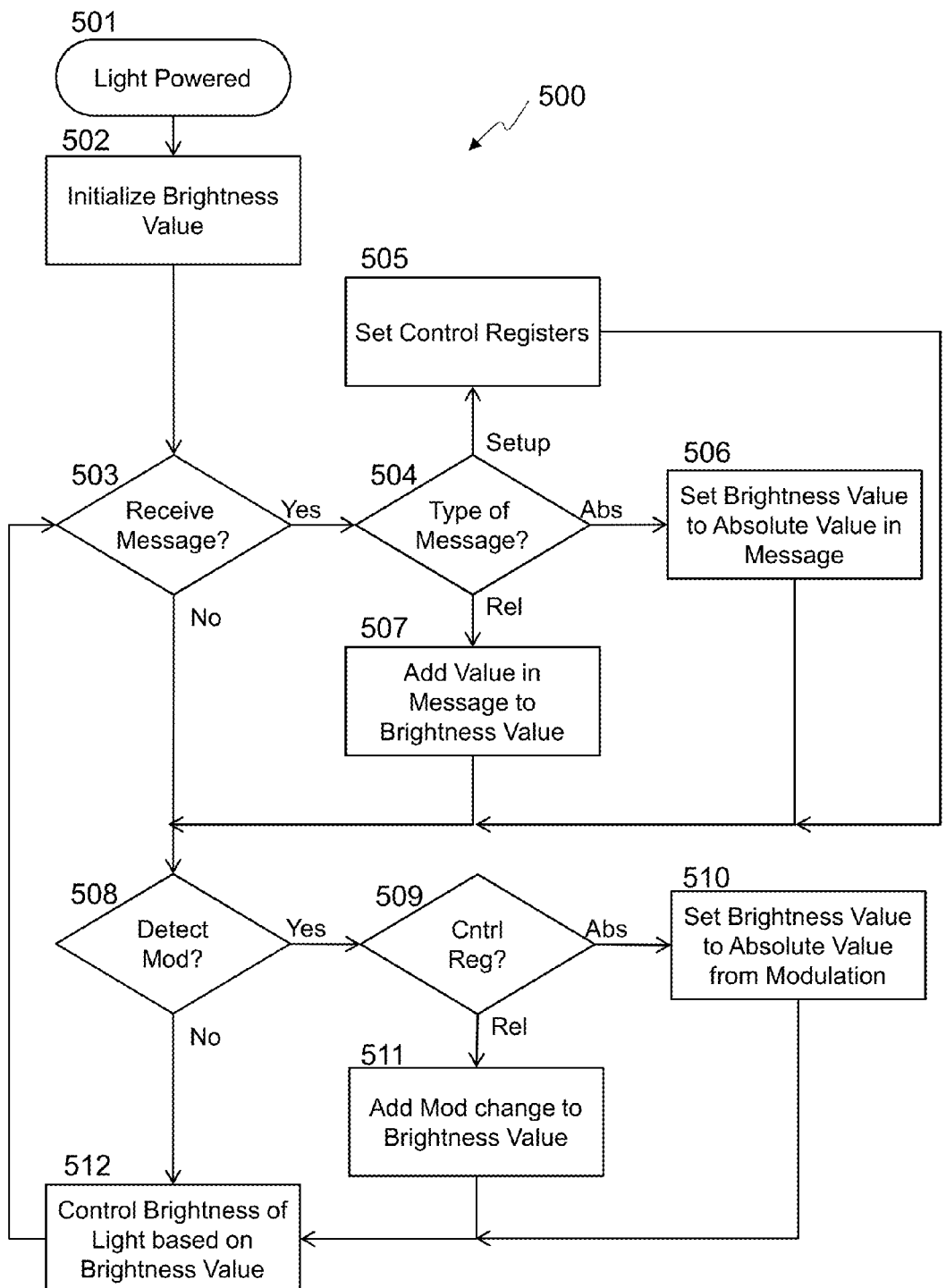
FIG. 5 is a flow chart of an embodiment of a method of dual-mode dimming of a light.

FIG. 5 is a flow chart 500 of an embodiment of a method of dual-mode dimming of a light. As the light emitting apparatus is powered up a block 501, a brightness value may be initialized at block 502. In some embodiments, the brightness value may be initialized to a maximum value and other embodiments may initialize the brightness value based on a previous brightness value which may have been stored in non-volatile memory before powering down. The maximum value and resolution of the brightness value may vary by embodiment. In at least one embodiment, the brightness value may be an integer value that may range from 0 to 100. In another embodiment, the brightness value may be an eight bit value ranging from 0 to 255. Other embodiments may use a 16 bit or 32 bit integer variable or a floating point variable for the brightness value. Some embodiments may limit the brightness value to a specific positive range while others may allow both positive and negative values. Other control registers may also be initialized based on values stored in non-volatile memory in the light emitting apparatus. Examples of registers that may be initialized may include enable registers for brightness changes due to network messages and power line modulation, registers to determine whether changes to the brightness level are relative or absolute, registers to determine which algorithm to use, or any other type of control or status register.

At block 503 a check of whether a message has been received over the network may be made. If a message has been received, the type of message may be checked at block 504. In some embodiments, the message may include setup or configuration information. If such a message is received, control registers such as those described above may be set based on the information in the message in block 505. If the message is an absolute change of the brightness value, the brightness value may be set to an absolute value based on the information in the message in block 506. If the message is a relative change of the brightness value, the brightness value may be changed by an amount based on the information in the message in block 507. The determination of whether an absolute or relative change to the brightness value may be based on information in the message itself, or may be based on settings of the control registers, or some combination of both. Some embodiments may only implement absolute changes or only relative changes.

After checking for a message from the network in block 503 and if a message was received, processing the message in block 505, block 506 or block 507, the modulation of the power input may be detected in block 508. In some embodiments, only a change in the characteristic of the modulation may be detected, but some embodiments may detect the characteristic of the modulation at a regular interval. Some embodiments may look for a change the characteristic greater than a threshold amount before determining that a change is valid. For example, one embodiment may wait for the characteristic of the modulation to change by at least 5% before determining that a change has actually occurred to minimize the impact of noise. If the modulation is detected, control registers may be checked at block 509 in some embodiments to determine how to interpret the change in modulation. Some embodiments may include a capability for the brightness value to be changed to the absolute value of the modulation at block 510. So if the characteristic is determined to be 50% at block 508, in one example the brightness value may be set to 50% at block 510. Some embodiments may include a capability for a change in the characteristic to make a relative change to the brightness value at block 511. In such embodiments if it is detected that the characteristic changes from 50% to 60%, in one example 10% may be added to the brightness value.

At block 512 the brightness value may be used to control the brightness of a light emitting device. The control may be accomplished through the use of one or more control lines to driver circuitry for the light emitting device or by directly driving the light emitting device. The method for controlling the brightness of the light emitting device may vary according to the type of light emitting device, but may utilize pulse-width modulation or amplitude modulation in some embodiments. Although the flowchart 500 shows a serial check for messages at block 503 followed by detection of modulation at block 508 followed by control of the brightness of the light at block 512, embodiments may implement various methods of handling the three tasks that are in a different order, overlapped, or handled asynchronously to each other. Some embodiments may change the values received over the network or from the modulation detection in a linear or non-linear fashion before using the values to change the brightness value.

Some embodiments may maintain the brightness value as two different variables, one variable for the message information and one variable for the modulation information, and combine them to control the brightness at block 512. For example, one embodiment described in more detail in FIG. 6B may use the absolute value of the modulation characteristic to set a modulation value variable, and use relative value changes from the network to maintain a network value variable that may be either positive or negative. The brightness of the light may be based on a brightness value that is the sum of the modulation value variable and the network value variable so that any change to either the modulation level variable or the network variable may result in a change to the brightness value. In addition, if the sum is over a maximum value, the network value variable may be adjusted so that the sum does not exceed the maximum value. If the sum is less than a minimum value, the network value variable may be adjusted so that the sum is not less than the minimum value.

As will be appreciated by those of ordinary skill in the art, aspects of the various embodiments may be embodied as a system, method or computer program product. Accordingly, aspects of embodiments may take the form of an entirely hardware embodiment, an entirely software embodiment (including firmware, resident software, micro-code, or the like) or an embodiment combining software and hardware aspects Any combination of one or more computer readable storage medium(s) may be utilized to store instructions. A computer readable storage medium may be embodied as, for example, an electronic, magnetic, optical, electromagnetic, infrared, or semiconductor system, apparatus, or device, or other like storage devices known to those of ordinary skill in the art, or any suitable combination of computer readable storage medi-ums described herein. In the context of this document, a computer readable storage medium may be any tangible medium that can contain, or store a program and/or data for use by or in connection with an instruction execution system, apparatus, or device.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIGS. 6A and 6B show examples of dual mode dimming using two different embodiments. It should be understood that the brightness value 615. 665 may be used, serially or concurrently, by other circuitry, processes, methods, and/or software to control a brightness level of a light emitting device.

FIG. 6A shows an example using an embodiment having a single brightness value. At time period 601 the modulation characteristic 611 and the brightness value 615 are both at 100%. Near the end of time period 601 a message 613 may be received over the network that indicates that the brightness should be reduced by 10%. The message may have originated from a remote control, a smart phone, a computer, a cloud server, or any other source able to send a message over the network to the light emitting apparatus. In response to that message, a relative change to the brightness value may be made by subtracting 10% from the brightness value of 100% to give a brightness value of 90% during time period 602.

At the end of time period 602, the modulation characteristic changes from 100% to 70%, a change of −30%. In the algorithm used in FIG. 6A, the −30% change in the modulation is added to the 90% brightness value 615, a relative change of the brightness value 615, to give a brightness value 615 of 60% during time period 603. Near the end of time period 603, another network message 613 may be received that indicates a −100% change of the brightness of the lighting apparatus should be made. Other embodiments may include an 'OFF' command which may have a similar effect as a −100% change. A relative change to the brightness value 615 may be made by adding the change of −100% included in the message 613 to the brightness value 615 of 60%. While some embodiments limit brightness values to a range of 0% to 100%, in the example of FIG. 6A, the brightness value 615 may be outside of the range of 0% to 100%, so the brightness value 615 during time period 604 is −40%. The circuitry to control the brightness of the light emitting device may interpret any value below 0% as 'OFF' and any value above 100% as 'ON'.

At the end of time period 604 the modulation characteristic 611 may change +30% back to a 100% level. So the change in the modulation characteristic 611 may be added to the brightness value 615 to give a brightness value of −10% during timer period 605. A network message 613 indicating a +100% change may be received near the end of time period 605. Other embodiments may have an 'ON' command which may be equivalent. The change of +100% may be added to the brightness value 615 of 30%, to provide a brightness value 615 of 90% during time period 606.

The example shown in FIG. 6B is based on a different algorithm that may be used in some embodiments. In the algorithm shown in FIG. 6B, two variables 662, 664 are maintained as partial brightness values that may be combined to create a brightness value 665. Modifying or storing a partial brightness value, may be considered as modifying or storing the brightness value for the purposes this disclosure and claims. The first variable is a modulation value 662 which may be based solely on a modulation characteristic 661 in the embodiment shown. In this embodiment, the modulation characteristic may be specified to vary between 50% and 100%, with the lighting apparatus able to operate throughout the specified range. The modulation value 662 is linearly calculated from the modulation characteristic 661 with a modulation characteristic 661 of 50% mapping to a modulation value 662 of 0% and a modulation characteristic 661 of 100% mapping to a modulation value 662 of 100%. The second variable is a network value 664, which is used as an adjustment to the modulation value 662 in calculating the brightness value. If a relative change command is received as a message 663 over the network, the network value 664 may be adjusted by that amount and added to the modulation value 662 to calculate the brightness value 665. If the change in the network value 664 causes the brightness value 665 to fall outside of a range of 0% to 100%, the network value 664 may be adjusted so that the brightness value 665 falls within that range. If an absolute change command is received as a message 663, the brightness value 665 may be set to the absolute value received and the network value 664 changed to the brightness value 665 minus the modulation value 662.

In the example shown in FIG. 6B, the modulation characteristic and modulation value begin at 100% with the network value at −10% so that the brightness value 665 is 90% during the time period 651. A message 663 may be received near the end of time period 651 indicating an absolute change to 20% brightness. In response to this message 663, the brightness value 665 may be set to 20% and the modulation value 662 of 100% subtracted from the brightness value 665 to set the network value 664 to a value of −80%. So the brightness value of 20% is equal to the sum of the modulation value 662 of 100% and the network value 664 of −80% during time period 652.

At the end of time period 652, the modulation characteristic 661 changes to 75%. Due to the mapping described above for this embodiment, this causes the modulation value 662 to be set to 50%. The modulation value 662 of 50% is then added to the network value 664 of −80%, and because the sum is less than 0%, the brightness value is set to 0% during time period 653. The network value 664 is adjusted to have a value of −50% so that the brightness value 665 is equal to the sum of the modulation value 662 and the network value 664.

Near the end of time period 653, a message 663 indicating a relative change of +90% is received and added to the network value 664 to give a new network value of +40%. So during time period 654, the brightness value 654 is 90%, which is equal to the modulation value 662 of 50% and the network value 664 of +40%. Near the end of time period 654, the modulation characteristic changes back to 100% causing the modulation value 662 to be set to 100%. The modulation value 662 is added to the network value 664, and because the sum is greater than 100%, the brightness value 665 is set to 100% and the network value 664 is set to the difference between the brightness value 665 and the modulation value 662, or 0%, during time period 655.

Near the end of time period 655, a message 663 indicating a change of +10% is received. Since this relative change would cause the brightness value 665 to exceed 100%, the brightness value 665 is left at 100% and the network value 664 is set back to 0% so that the sum of the modulation value 662 and the network value 664 equal the brightness value 665.

While two different algorithms for controlling a brightness value, and thus a brightness of a light emitting device, based on a combination of a modulation characteristic and network messages have been illustrated in FIGS. 6A and 6B, other algorithms may be used in other embodiments. Some embodiments may use a single brightness value while others may use two or more partial brightness values to determine the brightness value. The modulation characteristic and information in messages may be used in many different ways to change the brightness value which may involve changing one or more partial brightness values. Other algorithms may involve averaging two or more partial brightness values, performing a minimum or maximum function of two or more partial brightness values, applying a mapping function such as a gamma curve, or other mathematical calculation to determine the brightness value. Some embodiments may include programmability using control registers, switches, rotating selectors, or other mechanisms to allow different algorithms to be selected in a single apparatus.

Examples of various embodiments are described in the following paragraphs:

An example method for controlling brightness of a light emitting apparatus may include controlling a brightness of a light emitting device based on a brightness value, receiving a message over a network and changing the brightness value based on the message, detecting a modulation of a power input of the light emitting apparatus, and changing the brightness value based on the modulation. In some example methods the power input includes alternating current electrical power, and the modulation includes phase control of the alternating current electrical power. In some example methods the modulation includes amplitude control of the power input. In some example methods the detection of the modulation of the power input includes measuring a phase or a duty cycle of the power input. In some example methods the detection of the modulation of the power input includes measuring an amplitude of the power input. In some example methods the light emitting device includes one or more LEDs. In some example methods the light emitting device includes a fluorescent tube. In some example methods the message is received from a power line network. In some example methods the message is received from a radio frequency network. In some example methods the radio frequency network may be compliant with an IEEE 802.15.4 specification, an IEEE 802.11 specification, Zigbee, 6LoWPAN, Bluetooth, or Z-Wave. In some example methods the message includes information about a relative change of the brightness value. In some example methods the message includes information about an absolute value of the brightness value. Some example methods also include sending an outgoing message over the network to control a brightness of another light emitting apparatus. In some example methods the brightness of the another light emitting apparatus is based on the brightness value. Any combination of the examples of this paragraph may be used in embodiments.

An example article of manufacture may include a non-transitory storage medium having instructions stored thereon that, if executed, result in controlling at least one control line based on a brightness value, receiving a message over a network, changing the brightness value based on the message, and changing the brightness value based on information regarding a modulation of a power input. The at least one control line may be capable to control a brightness of a light emitting device. In some example articles, the instructions may further result in sending an outgoing message over the network to control a brightness of another light emitting apparatus. In some example articles, the instructions may further result in creating the outgoing message based on the brightness value. In some example articles, the instructions may further result in determining the modulation of the power input by measuring a duty cycle of a line. In some example articles, the instructions may further result in determining the modulation of the power input by detecting an amplitude of a line. In some example articles, the instructions may further result in communicating over a network compliant with an IEEE 802.15.4 specification, an IEEE 802.11 specification, Zigbee, 6LoWPAN, Bluetooth, or Z-Wave. In some example articles, the instructions may further result in making a relative change in the brightness value. In some example articles, the instructions may further result in making an absolute change in the brightness value. Any combination of the examples of this paragraph may be used in embodiments.

An example integrated circuit (IC) may include at least one control line output capable to control a brightness of a light emitting device, at least one memory location to store a brightness value, at least one input to receive information regarding a modulation of a power line, and supervisory circuitry coupled to the at least one control line output, the at least one memory location, and the at least one input. In the example IC the supervisory circuitry may be configured to receive a message over a network, change the brightness value based on the message, change the brightness value based on the information received from the at least one input, and control the at least one control line output based on the brightness value. In some example ICs the supervisory circuitry may be further configured to send an outgoing message over the network to control a brightness of another light emitting apparatus. In some example ICs the supervisory circuitry may be further configured to create the outgoing message based on the brightness value. In some example ICs the information regarding the modulation of the power line includes a duty cycle of the at least one input. In some example ICs the information regarding the modulation of the power line includes a voltage level of a line. Some example ICs may also include a wireless network interface coupled to the supervisory circuitry. In some example ICs the wireless network interface is arranged to communicate over a network compliant with an IEEE 802.15.4 specification, an IEEE 802.11 specification, Zigbee, 6LoWPAN, Bluetooth, or Z-Wave. In some example ICs the supervisory circuitry is further configured to make a relative change in the brightness value. In some example ICs the supervisory circuitry is further configured to make an absolute change in the brightness value. Any combination of the examples of this paragraph may be used in embodiments.

An example lighting apparatus may include at least one light emitting device, detection circuitry coupled to a power input of the lighting apparatus and arranged to detect a characteristic of a modulation of the power input, and a networked controller, coupled to the detection circuitry, configured to control a brightness of the at least one light emitting device based on a brightness value, and to change the brightness value based on the characteristic of the modulation of the power input and one or more messages received over a network. In some example lighting apparatuses the at least one light emitting element includes one or more LEDs. In some example lighting apparatuses the at least one light emitting element includes a fluorescent tube. In some example lighting apparatuses the characteristic includes a phase of an alternating current electrical power at the power input. In some example lighting apparatuses the characteristic incudes an amplitude of the power input. In some example lighting apparatuses the networked controller is further configured to send an outgoing message over the network to control a brightness of another light emitting apparatus. In some example lighting apparatuses the networked controller is further configured to create the outgoing message based on the brightness value. In some example lighting apparatuses the networked controller includes a wireless network interface arranged to communicate over a network compliant with an IEEE 802.15.4 specification, an IEEE 802.11 specification, Zigbee, 6LoWPAN, Bluetooth, or Z-Wave. In some example lighting apparatuses the networked controller includes a powerline network interface. In some example lighting apparatuses the networked controller is further configured to make a relative change in the brightness value. In some example lighting apparatuses the networked controller is further configured to make an absolute change in the brightness value. Some example lighting apparatuses also include a shell at least partially surrounding the at least one light emitting device, the detection circuitry and the networked controller, where the shell at least partially transparent and substantially the same size and shape as a typical incandescent light bulb, and the power input includes an Edison screw base coupled to the shell.

As used in this specification and the appended claims, the singular forms "a", "an", and "the" include plural referents unless the content clearly dictates otherwise. Thus, for example, reference to an element described as "an LED" may refer to a single LED, two LEDs or any other number of LEDs. As used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between. Unless otherwise indicated, all numbers expressing values of components, characteristics of modulation, and so forth used in the specification and claims may be rounded, are to be understood as being modified in all instances by the term "about." Numbers may not be assumed to have more significant digits than those shown and the recitation of numerical ranges by endpoints may include all numbers subsumed within that range, inclusive of the endpoints. Any element in a claim that does not explicitly state "means for" performing a specified function, or "step for"

performing a specified function, is not to be interpreted as a "means" or "step" clause as specified in 35 U.S.C. §112, ¶6.

The description of the various embodiments provided above is illustrative in nature and is not intended to limit the claims, their application, or uses of the principles described herein. Thus, variations that are not described, yet conform with the language of the claims should be thought of as additional embodiments. Such variations are not to be regarded as a departure from the intended scope of the description provided herein.

What is claimed is:

1. A method for controlling brightness of a light emitting apparatus, the method comprising:
   controlling a brightness of a light emitting device based on a brightness value;
   receiving a message over a network and changing the brightness value based on the message; and
   detecting a modulation of a power input of the light emitting apparatus, and changing the brightness value based on the modulation.

2. The method of claim 1, wherein the detection of the modulation of the power input comprises measuring a phase of the power input.

3. The method of claim 1, wherein the detection of the modulation of the power input comprises measuring an amplitude of the power input.

4. The method of claim 1, wherein the message is received from a radio frequency network.

5. The method of claim 1, wherein the message comprises information about a relative change of the brightness value.

6. The method of claim 1, wherein the message comprises information about an absolute value of the brightness value.

7. The method of claim 1, further comprising sending an outgoing message over the network to control a brightness of another light emitting apparatus.

8. The method of claim 7, wherein the brightness of the another light emitting apparatus is based on the brightness value.

9. An article of manufacture comprising a non-transitory storage medium having instructions stored thereon that, if executed, result in:
   controlling at least one control line based on a brightness value, wherein the at least one control line is capable to control a brightness of a light emitting device;
   receiving a message over a network;
   changing the brightness value based on the message; and
   changing the brightness value based on information regarding a modulation of a power input.

10. The article of manufacture as claimed in claim 9, wherein the instructions, if executed, further result in sending an outgoing message over the network to control a brightness of another light emitting apparatus.

11. The article of manufacture as claimed in claim 10, wherein the instructions, if executed, further result in creating the outgoing message based on the brightness value.

12. The article of manufacture as claimed in claim 9, wherein the instructions, if executed, further result in determining the modulation of the power input by measuring a duty cycle of a line.

13. The article of manufacture as claimed in claim 9, wherein the instructions, if executed, further result in communicating over the network using a 6LoWPAN protocol.

14. The article of manufacture as claimed in claim 9, wherein the instructions, if executed, further result in making a relative change in the brightness value.

15. The article of manufacture as claimed in claim 9, wherein the instructions, if executed, further result in making an absolute change in the brightness value.

16. An integrated circuit comprising:
   at least one control line output capable to control a brightness of a light emitting device;
   at least one memory location to store a brightness value;
   at least one input to receive information regarding a modulation of a power line; and
   supervisory circuitry coupled to the at least one control line output, the at least one memory location, and the at least one input;
   wherein the supervisory circuitry is configured to:
      receive a message over a network;
      change the brightness value based on the message;
      change the brightness value based on the information received from the at least one input; and
      control the at least one control line output based on the brightness value.

17. The integrated circuit of claim 16, wherein the supervisory circuitry is further configured to send an outgoing message over the network to control a brightness of another light emitting apparatus.

18. The integrated circuit of claim 16, wherein the information regarding the modulation of the power line comprises a duty cycle of the at least one input.

19. The integrated circuit of claim 16, wherein the information regarding the modulation of the power line comprises a voltage level of a line.

20. The integrated circuit of claim 16, further comprising a wireless network interface coupled to the supervisory circuitry.

21. The integrated circuit of claim 20, wherein the wireless network interface is arranged to communicate over the network using a protocol compliant with an IEEE 802.15.4 specification.

22. A lighting apparatus comprising:
   at least one light emitting device;
   detection circuitry coupled to a power input of the lighting apparatus and arranged to detect a characteristic of a modulation of the power input; and
   a networked controller, coupled to the detection circuitry, configured to control a brightness of the at least one light emitting device based on a brightness value, and to change the brightness value based on the characteristic of the modulation of the power input and one or more messages received over a network.

23. The lighting apparatus of claim 22, wherein the at least one light emitting device comprises one or more LEDs.

24. The lighting apparatus of claim 22, wherein the at least one light emitting element comprises a fluorescent tube.

25. The lighting apparatus of claim 22, wherein the characteristic comprises a phase of an alternating current electrical power at the power input.

26. The lighting apparatus of claim 22, wherein the networked controller is further configured to send an outgoing message over the network to control a brightness of another light emitting apparatus.

27. The lighting apparatus of claim 22, wherein the networked controller comprises a wireless network interface.

28. The lighting apparatus of claim 27, wherein the wireless network interface is arranged to communicate using a protocol compliant with an IEEE 802.15.4 specification.

29. The lighting apparatus of claim 22, wherein the networked controller comprises a powerline network interface.

30. The lighting apparatus of claim 22, further comprising a shell at least partially surrounding the at least one light emitting device, the detection circuitry and the networked controller, the shell at least partially transparent and substantially the same size and shape as a typical incandescent light bulb;

wherein the power input comprises an Edison screw base coupled to the shell.

* * * * *